United States Patent
Evans et al.

(10) Patent No.: US 12,549,246 B1
(45) Date of Patent: Feb. 10, 2026

(54) TOOL FOR FIXED AND MOBILE SATELLITE OPERATIONS

(71) Applicant: VIRGINIA SYSTEMS & TECHNOLOGY, INC., Warrenton, VA (US)

(72) Inventors: Matthew C. Evans, Warrenton, VA (US); Jonathan T. Hart, Warrenton, VA (US); Isaac T. Nelson, Warrenton, VA (US); Michael J. Beeler, Warrenton, VA (US)

(73) Assignee: ALTAMIRA TECHNOLOGIES CORPORATION, Mclean, VA (US)

( * ) Notice: Subject to any disclaimer, the term of this patent is extended or adjusted under 35 U.S.C. 154(b) by 404 days.

(21) Appl. No.: 18/351,238

(22) Filed: Jul. 12, 2023

Related U.S. Application Data

(60) Provisional application No. 63/389,662, filed on Jul. 15, 2022.

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC .......... H04B 7/18513; H04B 7/18519
See application file for complete search history.

(56) References Cited

U.S. PATENT DOCUMENTS

| | | | |
|---|---|---|---|
| 8,914,536 B2 | 12/2014 | Beeler et al. | |
| 8,959,189 B2 | 2/2015 | Davis et al. | |
| 9,178,607 B2 | 11/2015 | Beeler et al. | |
| 9,374,161 B2 | 6/2016 | Beeler et al. | |
| 2002/0146982 A1* | 10/2002 | McLain | H04B 7/18508 455/425 |
| 2009/0295628 A1 | 12/2009 | Wilson et al. | |
| 2019/0101640 A1* | 4/2019 | Devaraj | H01Q 19/10 |

OTHER PUBLICATIONS

"Carier Monitoring", Kratos SAT Monics, kratosdefense.com, downloaded Jul. 10, 2023.
"Solutions for Satellite Bandwidth Efficiency & Link Optimization", Comtech EF Data Comtech Network Planning Tool (CNPT), comtechefdata.com, downloaded Jul. 10, 2023.
"Customer Link Budget Tool (CLBT)", optimalsatcom.com, downloaded Jul. 10, 2023.
Greg Berlocher, "Different Ways to Optimize your Satellite Network", satellitetoday.com, Oct. 1, 2010.
Nandra et al., "Optimization of Satellite Link Design", IEEE SoutheastCon 2008, Apr. 3-6, 2008.
Juan Cantillo, "Cross-Layer Optimization Techniques for Satellite Communications Networks", Telecom ParisTech, 2008, English version.
"Satellite Network Optimization Services", digisat.org, downloaded Jul. 10, 2023.
"Satellite Optimization", riverbed.com, downloaded Jul. 10, 2023.

* cited by examiner

*Primary Examiner* — Samina F Choudhry
(74) *Attorney, Agent, or Firm* — The Marbury Law Group, PLLC

(57) ABSTRACT

A satellite communications link method operated on a computer system configured with machine learning capability for maximization of satellite link resources and minimization of obstacles to produce a maximized satellite communication link.

20 Claims, 7 Drawing Sheets

TOOL FOR FIXED AND MOBILE SATELLITE OPERATIONS

CROSS-REFERENCE TO RELATED APPLICATIONS

This patent application claims the benefit of U.S. Provisional Patent Application No. 63/389,662, filed on 15 Jul. 2022, the contents of which is incorporated by reference in its entirety.

FIELD OF THE INVENTION

This disclosure relates to a method for the planning and executing a communications link between a ground station and at least one aerial or space communications platform.

BACKGROUND OF THE INVENTION

Since the introduction of both space and terrestrial communications, there has existed a need to plan a communications infrastructure that provides the maximization of satellite resources by planning based on the user's location and the availability of satellite resources.

SUMMARY OF VARIOUS EMBODIMENTS OF THE INVENTION

In an embodiment, a method for planning a satellite communication link comprises executing a satellite communication link planning program comprising
  (a) inputting the user location, optionally via a terminal,
  (b) determining the look angle based on the user location,
  (c) searching databases comprising information about a satellite or a plurality of satellites in view based on the user's location,
  (d) accessing information about a satellite or a plurality of satellites in view based on the user's location,
  (e) accessing information about the beam or a plurality of beams for each or a plurality of satellites,
  (f) accessing the satellite dwell time overhead;
  (g) accessing the polarization, optionally circular or linear;
  (h) accessing the available frequency bands for a given satellite,
  (i) calculating the azimuth, elevation, and polarity of the terminal,
  (j) calculating the optimal antenna size based on current or future locations of the satellite,
  (k) analyzing the information to determining a satellite communication link based on the information,
  (l) providing the satellite communication link information, and
  (m) optionally, storing the session data for future retrieval and analysis.

In an embodiment, a method for planning a satellite communication link comprises executing a satellite communication link planning program comprising
  (a) inputting the user location, optionally via a terminal,
  (b) determining the look angle based on the user location,
  (c) searching databases comprising information about a satellite or a plurality of satellites in view based on the user's location,
  (d) accessing information about a satellite or a plurality of satellites in view based on the user's location,
  (e) accessing the available frequency bands for a given satellite,
  (f) accessing information about the beam or a plurality of beams for each or a plurality of satellites,
  (g) accessing the satellite dwell time overhead;
  (h) accessing the polarization, optionally circular or linear;
  (i) calculating the azimuth, elevation, and polarity of the terminal,
  (j) calculating the optimal antenna size based on current or future locations of the satellite,
  (k) analyzing the information to determining a satellite communication link based on the information,
  (l) providing the satellite communication link information, and
  (m) optionally, storing the session data for future retrieval and analysis.

In an embodiment, the user location can be the users current or future location.

In an embodiment, the method may further comprise machine learning to classify the data to produce a satellite communications link information. The machine learning may utilize both past and current empirical information in the form of the success or lack of success based on prior planning information. The machine learning system may be trained using historic data, current data, optionally accessed from static and/or dynamic databases, or a combination thereof. The machine learning system may be configured to access and/or process data from static databases, dynamic databases, and combinations thereof.

In an embodiment, the machine learning system can be configured to access and/or process data comprising weather data, terrain data, video data, geographic data, traffic data, satellite cost data, crowd-sourced data, signal strength, satellite positions, cost of satellite service, transmission times, obstructions to communications, wavelengths, location, optionally comprising latitude and longitude, altitude, terminal configuration, available satellites, available beam on a given satellite, topography, weather, minimum or maximum antenna size, minimum or maximum amplifier size, minimum carrier power level requirements, maximum carrier power level requirements, minimum look-angle requirements, maximum look-angle requirements, look angles with block-out/non-transmit zones and angles, and combinations thereof.

In an embodiment, the machine learning system can be configured to access and/or process data dynamic data, optionally updated in real-time, and static data, optionally sporadically updated.

In an embodiment, the machine learning system can be configured to access and/or process data stored on public databases, private databases, databases managed by government agencies, and combinations thereof.

In an embodiment, the machine learning system can utilize an algorithm selected from the group consisting of decision tree (DT), linear regression (LIR), logistic regression (LOR), support vector machine (SVM), Naïve Bayes (NB), k-nearest neighbors (KNN), K-means (KM), Random Forest (RF), Dimensionality Reduction Algorithms (DRA), Gradient Boosting (GB) algorithms, or a combination of more than one algorithm. The GB algorithm may be gradient boosting machine (GBM), extreme gradient boost (XGBoost), LightGBM, CatBoost, or an ensemble of algorithms.

In an embodiment, the machine learning system can comprise Reinforcement Learning System (RLS), and uses an algorithm selected from the group consisting of a Monte Carlo algorithm (MC), Q-learning (QL) algorithm, State-action-reward-state-action (SARSA) algorithm, Q-learning—lambda algorithm, SARSA—lambda algorithm, DQN (Deep Q Network) algorithm, DDPG (Deep Deterministic Policy Gradient) algorithm, A3C (Asynchronous Advantage Actor-Critic Algorithm) algorithm, NAF (Q-learning with normalized Advantage functions) algorithm, TRPO (Trust Region Policy Optimization) algorithm, PPO (Proximal Policy Optimization) algorithm, TD3 (twin delayed deep deterministic policy gradient) algorithm, SAC (Soft Actor-Critic) algorithm, or an ensemble of algorithms.

In an embodiment, the machine learning system, optionally a reinforcement learning system, is trained on data from static databases, dynamic databases, and combinations thereof.

In an embodiment, the machine learning system, optionally a reinforcement learning system, is trained on data comprising weather data, terrain data, video data, geographic data, traffic data, satellite cost data, crowd-sourced data, signal strength, satellite positions, cost of satellite service, transmission times, obstructions to communications, wavelengths, location, optionally comprising latitude and longitude, altitude, terminal configuration, available satellites, available beam on a given satellite, topography, weather, minimum or maximum antenna size, minimum or maximum amplifier size, minimum carrier power level requirements, maximum carrier power level requirements, minimum look-angle requirements, maximum look-angle requirements, look angles with block-out/non-transmit zones and angles, and combinations thereof.

In an embodiment, the machine learning system, optionally a reinforcement learning system, is trained on data comprising dynamic data, optionally updated in real-time, and static data, optionally sporadically updated.

In an embodiment, the machine learning system, optionally a reinforcement learning system, is trained on data stored on public databases, private databases, databases managed by government agencies, and combinations thereof.

In an embodiment, the method may further comprise accessing a computer system configured to execute the satellite communication link planning program via a terminal.

In an embodiment, the user location can comprise latitude and longitude.

In an embodiment, the user location can be manually input or dynamically set via locational information input from a positional device.

In an embodiment, the information about a satellite or a plurality of satellites in view can be based on the user's location comprising latitude and longitude. The information about a past satellite or a plurality of satellites in view based on the user's location comprising latitude and longitude. The information about a present satellite or a plurality of satellites in view based on the user's location comprising latitude and longitude. The information about a future satellite or a plurality of satellites in view based on the user's location comprising latitude and longitude.

In an embodiment, the information accessed by the method can further comprise gains and losses of power, gain, attenuation, atmospherics, scintillation effects, ionospheric effects, Faraday rotation, Adjacent Channel Interference (ACI), Adjacent Satellite Interference, and combinations thereof.

In an embodiment, the method can further comprise sending instructions for controlling a satellite antenna or a plurality of satellite antennas to support satellite communication link(s).

In an embodiment, the method can operate on a standalone computer system.

In an embodiment, the method can operate on a cloud-based system.

In an embodiment, the method can further comprise pre-planning an optimal path to ensure beam coverage based on geolocation, blockages, optionally based on geography, weather events, and combinations thereof.

In an embodiment, the method can further comprise scheduling the execution of the user data during regulatory permissive periods, optionally when the terminal is at maximum performance to transmit data.

In an embodiment, the method can be executed on an user interface.

In an embodiment, the method can be executed on a machine-to-machine interface.

In an embodiment, the method can further comprise processing a Link-Budget Analysis (LBA) to calculate free-space path loss (FSPL), atmospheric degradation, signal degradation, or a combination thereof. The Link-Budget Analysis (LBA) is a cursory Link-Budget Analysis (LBA) or a detailed Link-Budget Analysis (LBA).

In an embodiment, the method can further comprise providing an estimated signal power analysis for the purpose of satellite tracking for mission planning purposes.

In an embodiment, the method can comprise accesses information about potential interferences with the satellite communications link. The potential interferences comprise terrain, weather, space debris, space weather, or a combination thereof.

In an embodiment, the method can comprise access information stored on dynamic databases.

In an embodiment, the method can comprise accesses information stored on static databases.

In an embodiment, the method can comprise accessing data comprising location, optionally comprising latitude and longitude, altitude, terminal configuration, available satellites, available beam on a given satellite, topography, weather, and combinations thereof.

In an embodiment, the program accesses information and calculates the satellite communications link in real time, optionally adjusting for real time changes in the information. The method program can utilize machine learning to adjust for real time changes in the information.

In an embodiment, the user can set criteria to limit the selection of a given satellite configuration based on a minimum or maximum antenna size, minimum or maximum amplifier size, minimum carrier power level requirements, maximum carrier power level requirements, minimum look-angle requirements, maximum look-angle requirements, look angles with block-out/non-transmit zones and angles, or a combination thereof.

In an embodiment, the terminal can be a fixed terminal, Communications on the Move (COTM) system, Communication on the Pause (COTP), or a combination thereof.

In an embodiment, the satellite can be a LEO satellite, GEO satellite, MEO satellite, or a combination thereof.

In an embodiment, the method can be executed on a disparate and distributed configuration where the method and system operate in a cloud-based configuration.

In an embodiment, the planning information, for satellite, beams, and any information required for feeding the tool can be stored on the standalone server, stored separately from the standalone server, stored in a cloud network, or a combination thereof.

In an embodiment, the satellite communications link information can be stored on a standalone server, stored separately from a standalone server, stored in a cloud network, or a combination thereof.

In an embodiment, a system can be configured to execute the method described herein. The system can comprise a terminal comprises a modem communicatively coupled to at least one satellite, access to a plurality of repeating relays, optionally access to a plurality of regenerative relays with on-board processing, and a directional antenna requiring pointing to at least one aerial or space communications platform for connectivity.

BRIEF DESCRIPTION OF THE DRAWINGS

The advantages and features of the present invention will become better understood with reference to the following more detailed description taken in conjunction with the accompanying drawings.

DETAILED DESCRIPTION OF PREFERRED EMBODIMENTS

Figure 1:
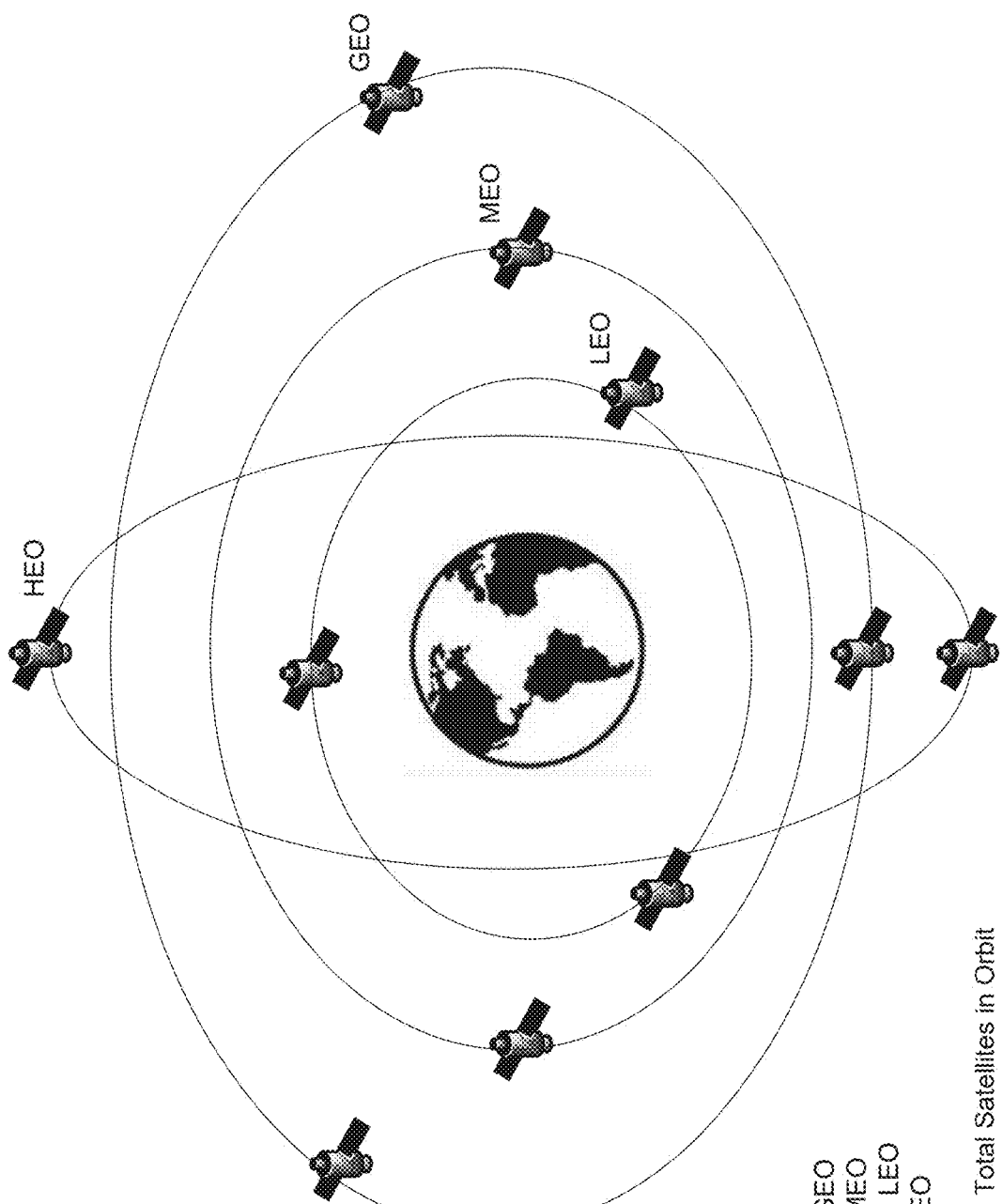
FIG. 1 shows a network with local and remote terminal with a hybrid LEO, MEO, GEO, and HEO satellite network.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Definitions

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

"Dynamic data," as used herein, refers broadly to data that is updated in real time and made available across multiple databases. Dynamic data may be stored in remote databases, e.g., cloud-based databases, and rapidly accessed in real-time.

"Machine Learning (ML)," as used herein, refers broadly to a collection of algorithms to allow a computer to learn as well as adapt based on feedback and conditions at the time of occurrence, resulting in the ability to change the outcome of future responses, based on prior feedback.

"Satellite Communications," as used herein, refers broadly to a network where a fixed or mobile Earth Terminal (ET) or an Airborne Terminal (AT) sends a signal to a repeating relay overhead. The repeating relay can be a LEO, MEO, GEO, or HEO space-based satellite. The repeating relay may be an aircraft or balloon. Upon exiting the repeating relay, the signal, processor or in a native format, is then relayed to the same or different (disparate) ET or AT.

Satellites fall into the following categories: Low-Earth Orbit (LEO), Medium Earth Orbit (MEO), Geostationary Earth Orbit (GEO), and Highly Elliptical Earth Orbit (HEO). Each orbital configuration provides the capabilities described below.

The LEO is the closest orbit to the Earth, operating at 500 to 1,200 km (310 to 745 miles) above the Earth. The LEO configuration provides: Low latency to/from the satellite with propagation times typically less than 40 mS (Round Trip), low loss due to the short path to/from the satellite—smaller antenna less than 0.5 meters in diameter, and short time the satellite when satellite is in view—less than 5 minutes but requires a tracking type antenna. Finally, the coverage area is limited, but the beam is highly concentrated.

The MEO is considered a medium orbit to the Earth, operating at 5,000 to 20,000 km (3,100 to 12,400 miles) above the Earth. The MEO configuration provides medium latency to/from the satellite—typically less than 180 mS (Round Trip)—good response time, medium loss due to the short path to/from the satellite—small antenna less than 0.75 meters in diameter, and medium time when satellite is in view—typically less than 20 minutes—tracking style antenna. The coverage area is limited, but the beam is well concentrated.

The GEO is considered a high orbit to the Earth, operating at 36,000 km to 40,000 (22,300 to 24,854 miles) above the Earth. The GEO configuration provides high latency to/from the satellite with typically less than 600 mS (Round Trip)—slow response time, high loss due to the long path to/from the satellite, larger antenna than 0.75 meters, since the satellite location is fixed (stationary)—fixed antenna (no moving parts). The coverage area is large, and the beam is not concentrated.

The HEO is configured similarly to the GEO, but due to its highly-elliptical orbit (HEO), a tracking style antenna is required. The coverage area is large, and the beam is not concentrated as provided by a GEO satellite.

All satellites move in their orbits, but GEO satellites have the least movement; relative to the Earth or close-to-Earth observer, they do not move. The movement of the satellite is highly predicable and is described as the satellite's ephemeris information. The satellite ephemeris data is information about the current and predicted (future) position of the satellite. These data include estimates of the location (orbital), timing, health of the satellite, and beam location. Data are considered good for up to 30 days into the future. The satellite ephemeris information can become stale (inaccurate) if an orbital correction has been made. By knowing the ephemeris data of an entire satellite fleet, one can track a satellite and know when it will go out of view and also know where to go to get the next available satellite. For GEO satellites, one dish solution is sufficient, but for HEO, MEO, and LEO satellites, two antennas are "desirable" due to handoff when the satellite reaches the horizon. A break-before-make: If only one dish is available—results in an interruption in service during repoint; but a make-before-break: If two dishes are available—no interruption in service since one antenna tracks while the other goes to the next satellite.

"Satellite Constellation," as used herein, refers broadly to a group of LEO, MEO, GEO, or HEO from a given company or manufacturer. The term "constellation" is defined as being in the same orbital distance from the Earth.

"Beam Maps" as used herein refers broadly to the contour map that is provided by the repeating relay towards the transmission terminal as a down link (from the satellite) and is expressed in terms of Effective Isotropic Radiated Power (EIRP). Conversely, a contour is utilized for supporting the uplink (to the satellite) and is expressed in terms of Gain over Temperature (G/T).

"Transmission Planning" as used herein refers broadly to the process that is followed where a known location on the Earth or above the Earth is chosen to communicate with the same or disparate location for sending a signal to a repeating relay. A repeating relay can be chosen from a list, sorted list, or optimized list based on location or time. A beam map is selected from a list, sorted list, or optimized list based on location or time. A link-budget analysis is performed based on the transmit and receive terminal's configuration to ensure a link can be created. Further other conditions such as terrain, weather, ionospheric effects, tropospheric effects, optionally attenuation, rain attenuation, gas absorption, depolarization, sky noise, or combinations thereof, and space-based debris may be considered for the transmission planning.

"Link Budget Analysis" as used herein refers broadly to a mathematical exercise where elements including but not limited to the gains and losses of power, gain, attenuation, atmospherics, scintillation effects, ionospheric effects, Faraday rotation, Adjacent Channel Interference (ACI), Adjacent Satellite Interference, and combinations thereof.

"Library," as used herein, refers broadly to the collection of satellite information in the form of beam maps, ephemeris data to include the time of orbital location path/direction of satellite, and other information.

"Machine Learning (ML)," as used herein, refers broadly to a collection of algorithms to allow a computer to learn, as well as adapt, based on feedback and conditions at the time of occurrence, resulting in the ability to change the outcome of future responses, based on prior feedback.

"Static data," as used herein refers broadly to data that is unchanging or is so rarely changed that it can, optionally, be stored remotely. In an embodiment, static data is updated periodically or sporadically. Static data may be referred to as historic data. Static data may be predictive or future data that was created and will be utilized at a future time and date.

"User input data," as used here, refers broadly to data provided to the system by a user, e.g., operator.

Maximization of Satellite Resources

The methods and systems described herein comprise planning a communications link to and from a repeating relay, such as a satellite link or airborne relay using the information that is available for link planning.

The methods and systems described herein utilize a computer program comprising a step of a user executing a method to review a prior event, a near-term event, and/or a future event for where a satellite communication path is required. For example, the user can execute the method for planning a satellite communication path in view of known resources, known obstacles, expected resource availability, predicted obstacles, or a combination thereof, wherein the method utilizes information stored on static and dynamic databases via machine learning.

The methods and systems described herein maximize satellite resources by planning based on the user's location and the availability of satellite resources and/or obstacles to a successful satellite communication path, e.g., weather, geographic formations, buildings, space events (e.g., solar flares, micrometeorites, space debris). The satellite resources are repeating relays that fall into the class of Geostationary-Earth Orbit (GEO), Medium-Earth Orbit (MEO), Low-Earth Orbit (LEO), Highly Elliptical Orbit (HEO) satellites, or combinations thereof. Depending on the location of the user's position (latitude and longitude) on the Earth, the look angle is then utilized to determine available satellite resources based on the past, current, and/or further location of a given satellite in the form of ephemeris positional data. The methods and systems described herein for planning a satellite communication path include the combination of the location of a given satellite resource with the ability to combine not only what satellites will be (or were) in view at a given time (past, present, and future), the combination of knowing the available frequencies, satellite footprints (beams), polarization (circular or linear), optimal antenna size, and obstacles to a successful satellite communication path, e.g., weather, geographic formations, buildings, space events (e.g., solar flares, micrometeorites, space debris) and then interfaces with a steerable satellite antenna or antennas for supporting a communications link. The methods and systems described herein can utilize a stand-alone or cloud-based process to interface between the satellite location data and beam information and satellite antenna as a machine-to-machine interface and then a human-to-machine interface to configure, request, maximize, and finally determine an available satellite link, optionally the best available satellite link, e.g., a satellite link with the best resources and least identified obstacles.

In the methods and systems described herein, a user is presented with numerous configuration options to plan for a given type of satellite communications band, link, or established criteria a minimum (or maximum) including but not limited to antenna size, power amplifier, geography, or power level to support a given mission. For example, a user may use a flow-based operation controlled by a human following a known flow or procedure to plan out path with maximized resources and minimized obstacles.

The methods and systems described herein can comprise blockage and impediment information (obstacles) based on geographical blockages (obstruction of the line-of-sight (LOS) view from the satellite antenna to the satellite), including but not limited to building and mountains based on three-dimensional topographical information; and weather events including but not limited to heavy rain that may cause rain-attenuation based on the band of operation, resulting in lower signal quality. The weather information may be provided by a governmental body or commercial weather outlet services for real-time, near real-time, or predicted weather events for consideration when planning for a satellite link. The weather databases can comprise both static (periodically updated) and dynamic databases (continuously updated). The method and systems described herein can comprise including the geographical blockages, where the data is stored on, generally, static databases.

The methods and systems described herein can comprise utilizing the Elasticsearch database. While the Elasticsearch database is not a relational database, the described invention is not limited to non-relational databases, but may include relational databases.

The method and systems described herein may provide a planned link, planned using a link-budget analysis (LBA) where a cursory or detailed LBA may be utilized to ensure the viability of a link based on the location of the user terminal or the track of a satellite terminal.

The user is presented with numerous configuration options to plan for a given type of satellite communications band, link, or established criteria a minimum (or maximum) including but not limited to antenna size, power amplifier, geography, or power level to support a given mission. A flow-based operation controlled by a human following a known flow or procedure to plan out a satellite communications path can be used.

The methods and systems described herein can comprise a step of using Machine Learning (ML) for maximizing of satellite resources and minimization of obstacles. With introduction of ML techniques, the methods and systems described herein can be utilized in a fashion where maximization of resources and minimization of obstacles may be performed using "learning capabilities" where the combination of the latitude/longitude, potential satellite links, available satellite beams, topographical information, weather, and combinations thereof are used. When combining these techniques with either a stationary or mobile communications platform, scenarios may be analyzed for past, present, and future communications links. Additionally, using Machine Learning, prior information may be utilized where links were planned and the resultant information may be utilized for planning present and predicting future communications paths. When combining large amounts of information in the form of satellite assets, available hardware for a terminal, potential locations (or paths), topography, and weather, a user can predict with a higher level of confidence if a specific level of communications reliability may be achieved. Through Machine Learning, one may establish thresholds of quality that must be achieved using an iterative approach where only specific configurations and locations would be attempted based on the resulting predictions. Having access to prior data in the form of previously planned configurations and actual empirical configurations with the resulting data may be used to optimally plan out links. The Machine Learning process may be run locally on a standalone configuration or in cloud-based configuration where multiple processing platforms in a disparate fashion may be brough to bear for mission planning.

The methods and systems described herein can be supported on a computer or computers that operate in a standalone or cloud-based fashion using standard computing practices and languages.

The method and systems described herein can be readily applied to any transmission link known hereafter as the planning tool for fixed and mobile LEO, MEO, GEO, and HEO satellite operations, balloon, and airborne relays ("planning tool for fixed and mobile satellite operations").

The planning tool for fixed and mobile satellite operations is a method(s) and resulting system(s) described herein that comprise a method that analyzes a prior event, a near-term event, or a future event for where a satellite communication path is required. In addition, potential interferences with the establishment of a communications link between a ground station and at least one aerial or space communications platform must be taken into consideration. Additionally, the planning process may be controlled and further optimized through the use of Machine Learning (ML) techniques, where large amounts of information that would traditionally be applied sequentially by a human may instead be utilized by ML where multiple conditions may be applied to further maximized and determine maximized links for satellite communications networks.

The methods and systems described herein comprise a planning tool for fixed and mobile satellite operations, but are not limited to, maximizing satellite planning for LEO, MEO, GEO, and HEO resources using standalone and cloud-computing processing using available information ephemeris satellite information. The inventors found that the combination of the terminal's (transmitter and receiver) latitude/longitude, potential satellite links, available satellite beams, topographical information, and weather, may be combined to provide information for the creation of a repeating relay including but not limited to a satellite, balloon, or airborne.

The disclosed invention uses the described techniques and results in one or more descriptions to support the creation and manipulation of available information about a satellite's type (LEO, MEO, GEO, and HEO), available beams, topographical, and weather information using either standalone, cloud-computing, or a combination of standalone and cloud-computing processing resources for link planning.

Particular implementations described herein are, and may use, but are not limited to programs, computer programming languages, microprocessors, Application Specific Integrated Circuits (ASICs), Field Programmable Gate Arrays (FPGAs), and combinations of Central Processing Units (CPUs), Graphic Processing Units (GPUs), System on a Chip (SoC) comprised of a CPU and a hardware acceleration device, and High-Performance Computing (HPC) resulting in servers using a combination of CPUs, GPUs, or FPGAs in either standalone or cloud-based architecture.

Aspects of this disclosure relate to a method and system for creating methods of planning and optimizing a communications link to and from a repeating relay.

In reference to the figures, FIG. 1 illustrates the growth of a satellite industry with the introduction of LEO and MEO satellite networks. LEO companies such as SpaceX with the introduction of Starlink and Amazon with introduction of Project Kuiper, OneWeb, and Telesat with the introduction of LightSpeed will have tens of thousands of LEO satellites in orbit in the coming years. MEO satellites have been operational for years with O3B with mPower as being successfully operational for several years. The combination of LEO, MEO, GEO, and HEO satellite networks provide access from a few hundred GEO or HEO communication satellites from the early 2010 to approaching 10,000 LEO, MEO, GEO, and HEO satellites in 2022. As shown from the Web site dewesoft.com (DEWESoft data and who owns them) there are thousands of satellites that will be available to be utilized for services and the opportunities have exploded to the point where one can no longer utilize simple textual tables or internet sites to determine an optimal satellite link. One may no longer simply choose an area for operation and choose a single satellite to provide communications. There is an urgent need for a method for considering availability of satellite resources, look angles from the ground terminal(s) to the satellite(s), blockages, available beams for a given satellite, and potential weather issues that may exist. As shown in FIG. 1, the ability to digest the amount of satellite resources can no longer be processed as a look up table or selection of a single satellite and then the service planned for the life of the use of a communications link.

Figure 2:
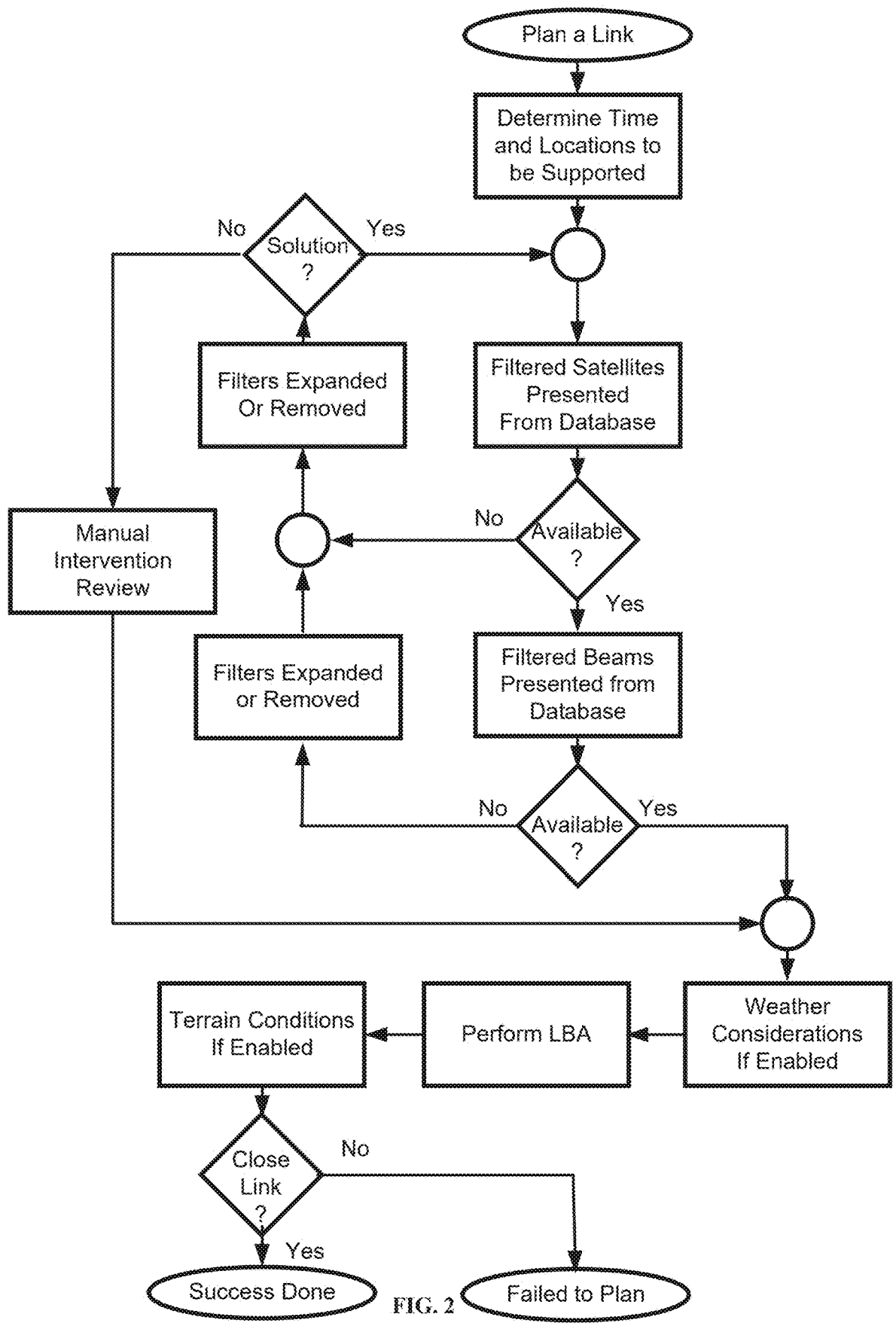
FIG. 2 shows an embodiment of a process flow with the described invention.

FIG. 2 shows the process flow with the described method, wherein one selects the transmission location or locations for the service to engineer a reliable transmission link. The flow chart demonstrates a flow from start-to-finish, showing the steps that one would follow to engineer a satellite transmission link. First, a link needs to be planned to start the process. Second, the location of the terminal is established. A user then selects the desired parameters for searching for satellite resources based on the location and time of desired service. An automated process searches both location and time of available satellite services based on, but not limited to, the Celestrak database. This same database may be downloaded and stored locally and retained on a standalone server should a network connection not be available. Third, an automated process then searches all chosen satellites and the beam maps obtained for review by either the user or the described method. Confirmation of the desired band and service location based on both terminal location, satellite position, and time are confirmed. If either a satellite or satellite beam map that covers a given location cannot be found, the link planning re-enters the search for less optimal satellite resources or bands and the process is restarted. In the event that no satellite, beam, or configuration thereof can be found, the algorithm defaults back to manual mode for human assistance. Fourth, upon successful identification of a satellite and satellite beam map, an LBA is planned and the results returned to the user along with a list of time and satellite (or satellites) where service may be obtained. If a satisfactory transmission link cannot be established, e.g., "the link can't be closed," with an LBA, the link planning is again passed back to the user to assist in link planning for other alternatives. Otherwise, the transmission link engineering of a satellite link is determined and confirmed that the link can be closed.

Weather data can be used in the analysis when a known time for service can be re-engineered to confirm the link availability based on the initial parameters established using the described method. Weather data, including static databases and dynamic databases for weather may be included in the analysis.

Terrain data can be used in the analysis where blockages may be evaluated based on known locations and the look-angles for a given service time and location for a given earth station location for satellite resources utilized for using the described method. Terrain data (geographic data) is, generally, stored on static databases.

Figure 7:
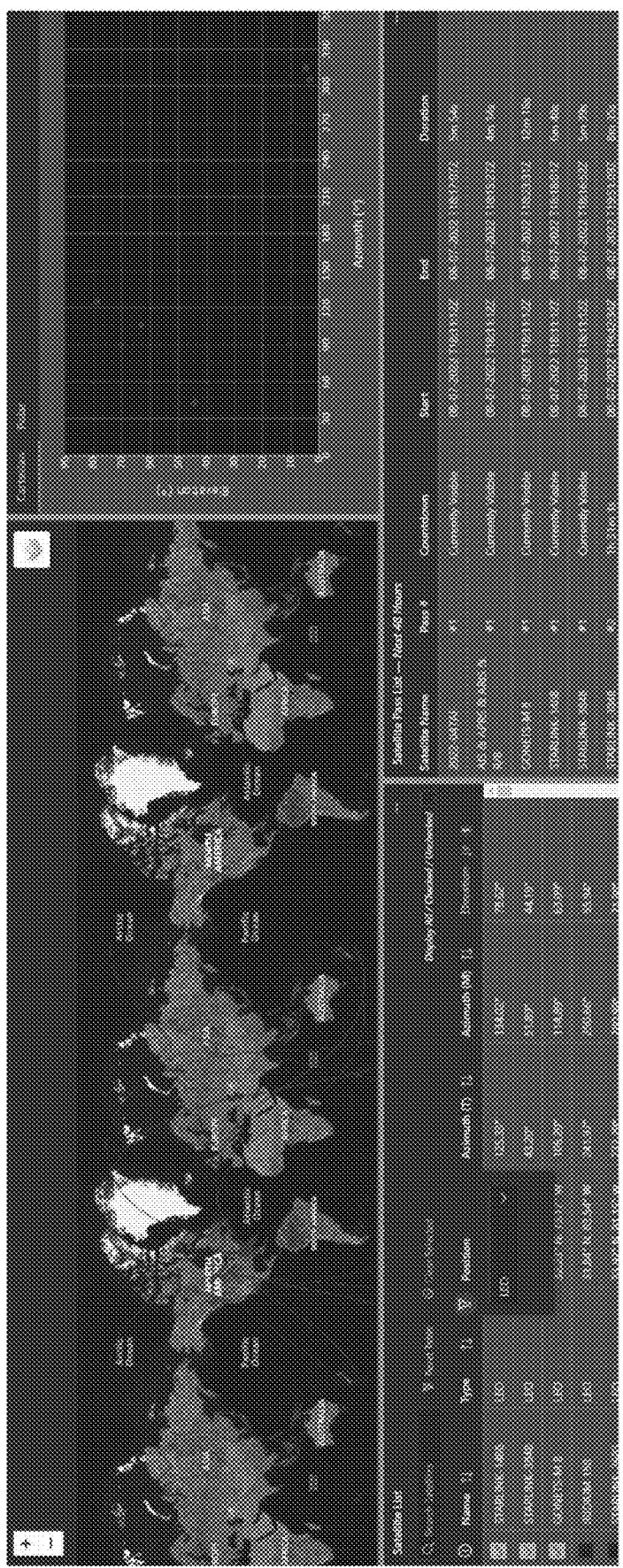
FIG. 7 shows an embodiment of an implementation of the described invention using LEO satellites.

FIG. 7 shows an implementation of an embodiment of a user interface according to the present disclosure. As shown, the location of the terminal's position (latitude and longitude) on the Earth (via a map location), the latitude and longitude are utilized to determine a look angle for all available satellite resources. A filter is enabled to only show LEO satellites and the tracks and times of each LEO satellite chosen are shown in the list, track and look angles to the satellite via either a Polar or Cartesian chart. One can realize when a satellite or satellites may be visible based on the "track" of the satellite over a given location.

Once the satellite or satellites are chosen, the beam maps can be presented to the user for use for planning a transmission link. Upon choosing the beam the method may perform a link budget analysis, thus planning the link using the described logic shown in FIG. 2.

The transmission planning process can comprise blockage and impediment information based on geographical blockages (obstruction of the line-of-sight (LOS) view from the satellite antenna to the satellite), such as buildings and mountains, based on three-dimensions topographical information; and weather events such as heavy rain that may cause rain-attenuation based on the band of operation, resulting in lower signal quality. The weather information may be provided by a governmental body or commercial weather outlet services for real-time, near real-time, or predicted weather events for consideration when planning for a satellite link.

The methods and systems described here may be supported on a standalone or cloud-based process to interface between a location where the database for the satellite data and beam information resides. The input configuration data can be in the form of terminal location, satellite communications band, type of link (desired bandwidth), or established criteria a minimum (or maximum) such as antenna size, power amplifier, geography, or power level to support a given mission. A flow-based operation controlled by a human following a known flow or procedure can be used to plan out a satellite communications path comprising maximized resources and minimized obstacles. The entire planning process can be performed in an automated flow-based planning process. The entire planning process can be assisted using an ML assist engine.

The planned link may be planned using a link-budget analysis (LBA) where a cursory or detailed LBA may be utilized to ensure the viability of a link based on the location of the user terminal or the track of a satellite terminal.

Figure 3:
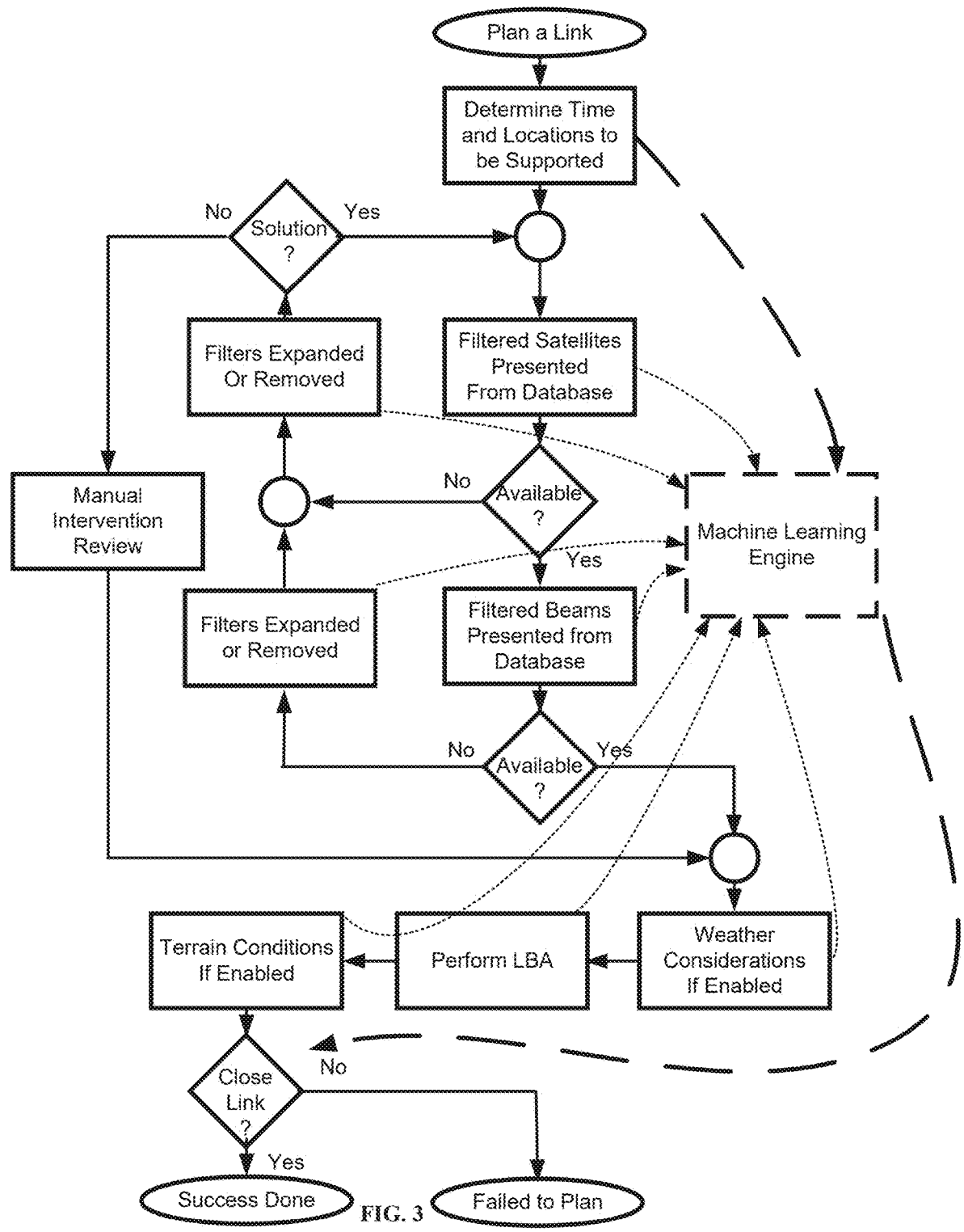
FIG. 3 shows an embodiment of a process flow utilizing machine learning with the described invention.

FIG. 3 depicts an flowchart where machine learning (ML) may be utilized to maximize resources and minimize interferences using "learning capabilities" bringing to bear the ability that the entire process described in FIG. 2, may be performed by ML. The ML process may take into consideration all aspects of every input, list, database, etc. to be considered for planning a link. The ML engine allows one to establish parameters for planning the link and then make considerations that would not be possible for a human to "steer or guide" for link planning. The ML engine may utilize many techniques described below to plan an optimal link. In the event that no link can be planned, then a failure to plan will be indicated and passed back to the user to change the metrics for performing the transmission link planning.

The method can analyze conditions including, but not limited to, signal strength, demand for satellite service, weather data, terrain data, video data, geographic data, traffic data, satellite cost data, crowd-sourced data, signal strength, satellite positions, cost of satellite service, transmission times, obstructions to communications, wavelengths, and combinations thereof, to identify potential disruptions in the communications network, and make recommendations to optimize the communications network, and/or execute the recommendations to maximize the satellite communications link.

The methods and systems described herein may analyze a plurality of input parameters to maximize the satellite communications link. The method may further comprise generating a further satellite communications link recommendation and reconfiguring the satellite communications link based on the further recommendation.

The machine learning capability may comprise a machine learning system. The machine learning system may be trained using static data. The machine learning system may access and/or process data from static databases, dynamic databases, and combinations thereof. The machine learning system may access and/or process data comprising weather data, terrain data, video data, geographic data, traffic data, satellite cost data, crowd-sourced data, signal strength, satellite positions, cost of satellite service, transmission times, obstructions to communications, wavelengths, and combinations thereof. The machine learning system may access and/or process data dynamic data, optionally updated in real-time, and static data, optionally sporadically updated. The machine learning system may access and/or process data stored on public databases, private databases, databases managed by government agencies, and combinations thereof.

The machine learning system may utilize an algorithm selected from the group consisting of decision tree (DT), linear regression (LIR), logistic regression (LOR), support vector machine (SVM), Naïve Bayes (NB), k-nearest neighbors (KNN), K-means (KM), Random Forest (RF), Dimensionality Reduction Algorithms (DRA), Gradient Boosting (GB) algorithms, or a combination of more than one algorithm. The GB algorithm may be gradient boosting machine (GBM), extreme gradient boost (XGBoost), LightGBM, CatBoost, or a ensemble of algorithms.

The machine learning system can be a Reinforcement Learning System (RLS), and may use an algorithm selected from the group consisting of a Monte Carlo algorithm (MC), Q-learning (QL) algorithm, State-action-reward-state-action (SARSA) algorithm, Q-learning-lambda algorithm, SARSA-lambda algorithm, DQN (Deep Q Network) algorithm, DDPG (Deep Deterministic Policy Gradient) algorithm, A3C (Asynchronous Advantage Actor-Critic Algorithm) algorithm, NAF (Q-learning with normalized Advantage functions) algorithm, TRPO (Trust Region Policy Optimization) algorithm, PPO (Proximal Policy Optimization) algorithm, TD3 (twin delayed deep deterministic policy gradient) algorithm, SAC (Soft Actor-Critic) algorithm, an ensemble of algorithms, and combinations thereof.

The machine learning system, optionally a reinforcement learning system, may be trained on data from static satellite, beam map, topographical, and weather databases, dynamic satellite, beam map, topographical, and weather databases, and combinations of these static and dynamic databases.

The machine learning system, optionally a reinforcement learning system, may utilize both historical, current, and future (predictive) data for planning an optimal communication link.

When combining these techniques, prior information may be utilized where links were planned and the resultant information may be utilized for planning present and future communications links. When combining large amounts of information in the form of satellite assets, available hardware for a terminal, potential locations (or paths), topography, and weather, one may predict with a level of confidence whether a specific level of communications reliability may be achieved. Through ML, one may establish thresholds of signal quality or system availability that must be achieved using an iterative approach where only specific configuration and locations would be attempted based meeting a minimum standard of service level.

Figure 4:
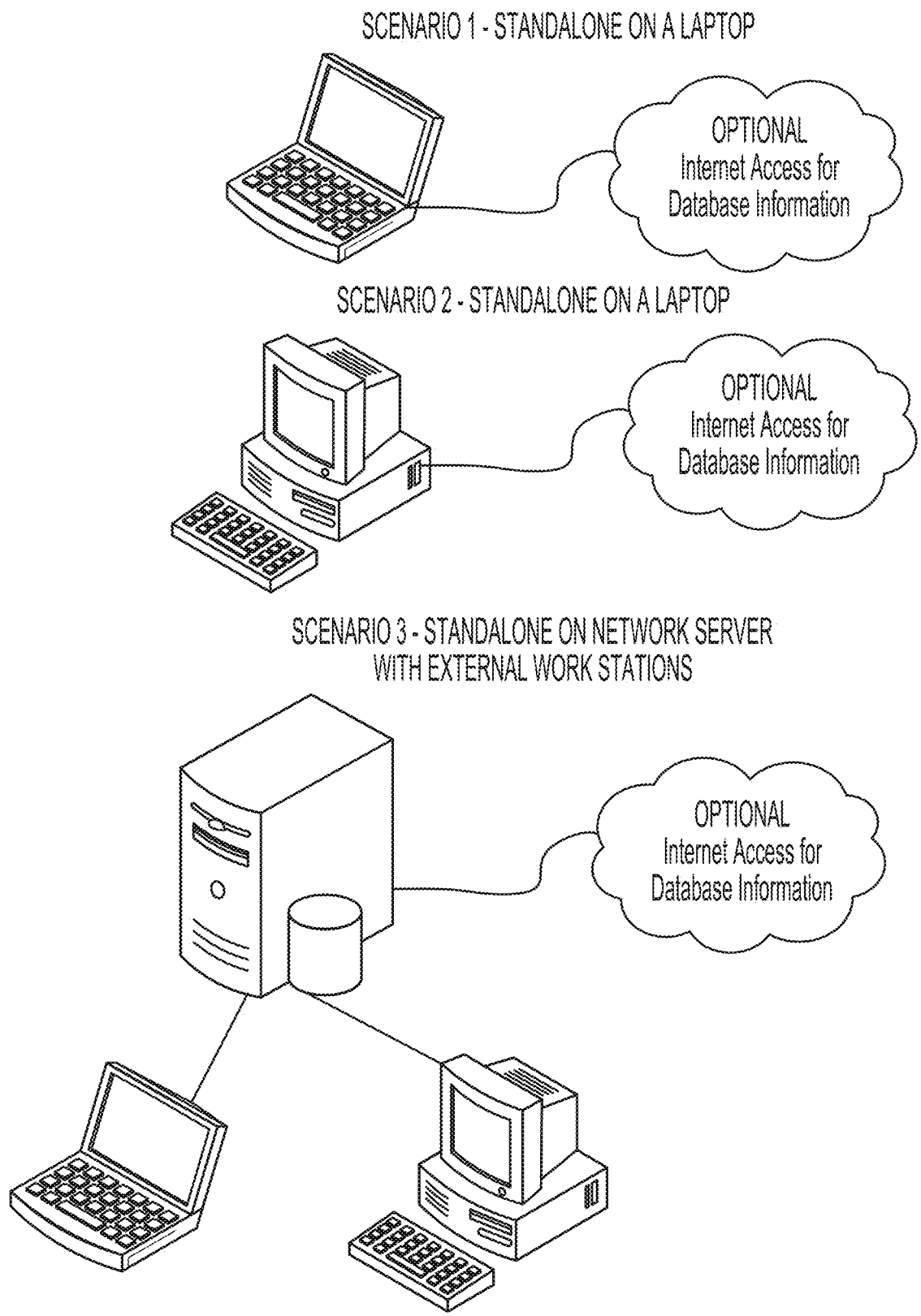
FIG. 4 shows the described invention being supported on a standalone computer.

FIG. 4 depicts an embodiment of the described invention supported as a standalone (dedicated) computing architecture. A single CPU or combination of CPU/GPU processor with single or multiple cores can support the described invention. The information to implement the described invention may be solely contained on the standalone computer or connected to a network where the described invention operates on the standalone computer, but obtains information from a network. Scenario 1 shows a method and system of the present disclosure running on a laptop PC. Scenario 2 shows a method and system of the present disclosure running on a Desktop PC. Scenario 3 shows a method and system of the present disclosure running on a Network Server supporting attached users on a Laptop PC and a Desktop PC.

Figure 5:
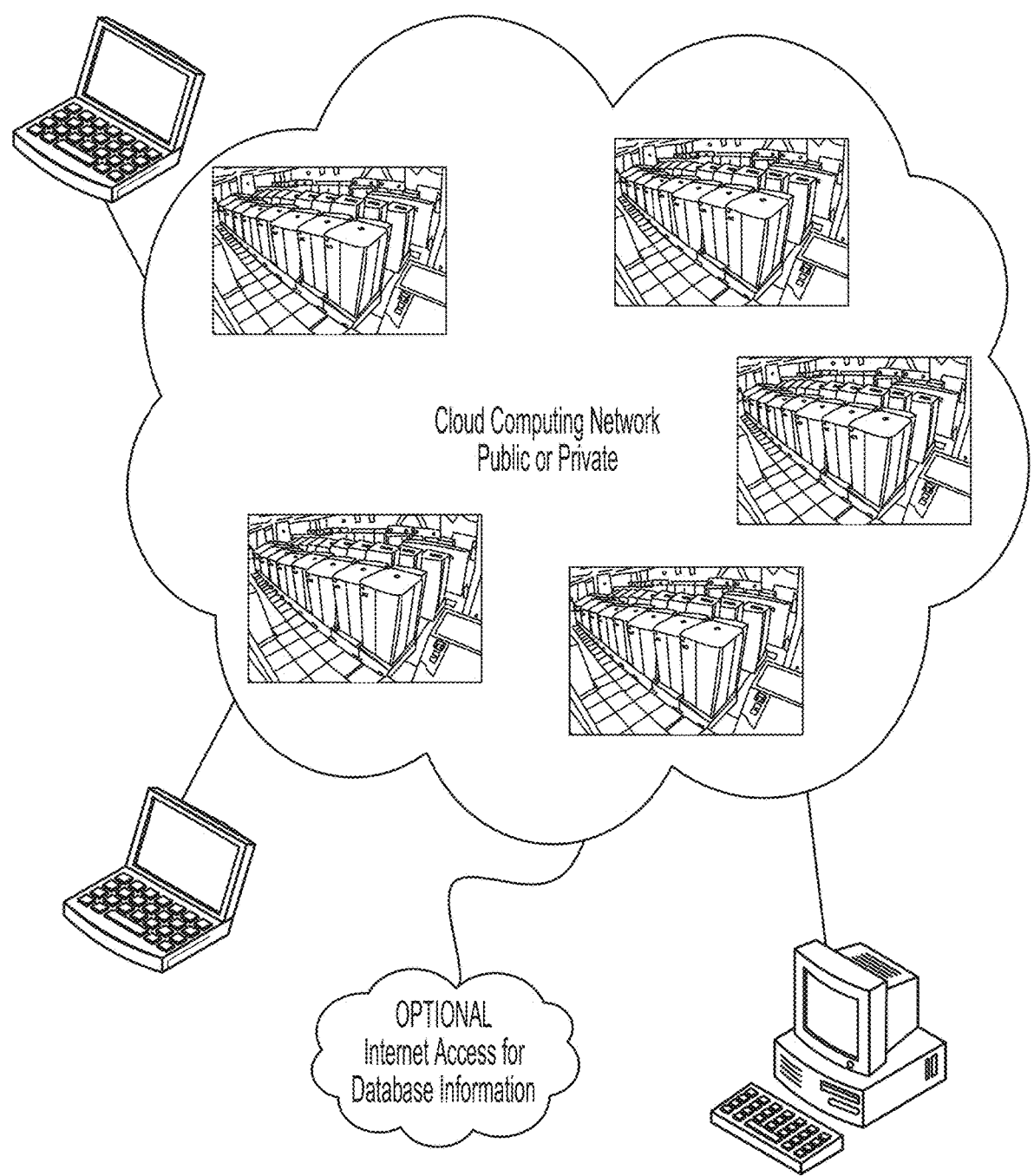
FIG. 5 shows the described invention supported by one or multiple cloud computing servers with flows between each of the processes residing on multiple servers distributed throughout the cloud.

FIG. 5 depicts an embodiment of a method and system of the present disclosure supported as a cloud computing architecture. A cloud-computing architecture can support the disclosed methods and systems with a single virtual CPU, dedicated CPU, High-Performance Computer (HPC) that is comprised of a CPU with a GPU or CPU with an FPGA or any combination of these computing resources as a single instantiation or a combination of distributed functions that are spread over multiple cloud-computing resources. The information to implement the described invention may be solely contained on a single cloud-computing provider or distributed among multiple cloud-computing vendors where the described invention operates within or distributed across the cloud-computing fabric. Access to the database may be on the same cloud-computing fabric or a connection to the Internet to another computing fabric access over the public Internet or private network.

The benefits of the methods and systems described herein using the planning tool for fixed and mobile satellite operations is a method(s) and resulting system(s) is as follows:

Assist with pre-planning of transmission possibilities prior to deployment of user system.

Assist with choosing best provider based on satellite coverage, frequency band, power requirements and revisit time.

Testing and evaluation of new technologies to meet communications requirements prior to equipment investment.

Troubleshooting of communications issues, identification of possible interference(s).

Command and control of remote systems from a single point.

Figure 6:
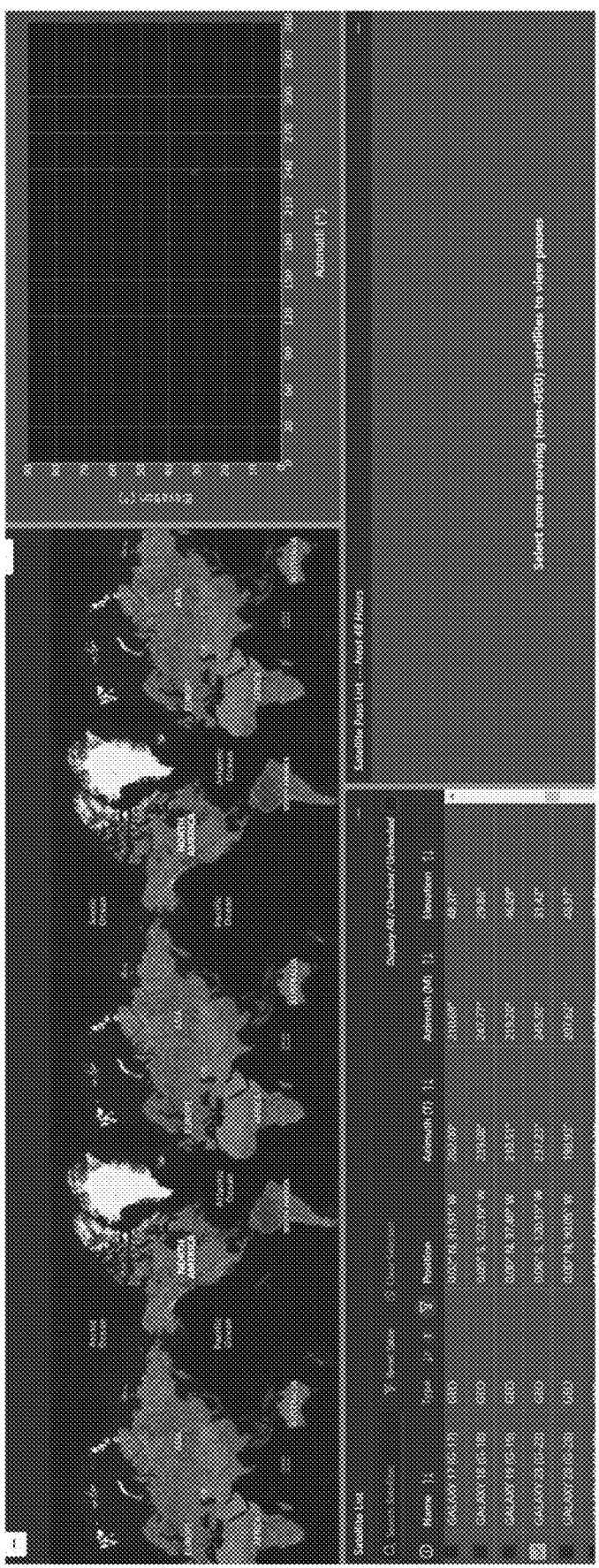
FIG. 6 shows an embodiment of an implementation of the described invention using GEO satellites.

FIG. 6 shows the implementation of the preferred embodiment of a user interface using the described invention. As shown the location of the terminal's position (latitude and longitude) on the Earth (via a map location), the latitude and longitude is utilized to determine a look angle for all available satellite resources. This may include both past, current, or further location of a given satellite in the form of ephemeris positional data. As shown, the type of service may be filtered by LEO, MEO, GEO, and HEO or any and all types of services on any and all configurations. The methods and systems described herein combine the ability of what satellites will be in view at a given time (past, present, and future), available frequencies, satellite footprints (beams), polarization (circular or linear), optimal antenna size, and potential obstacles (e.g., interferences with communications including but not limited to terrain, weather, space debris, space weather) with a steerable satellite antenna or antennas to create a recommended satellite communications link. This implementation shows azimuth (true) and azimuth (magnetic), and elevation to the satellite. A polar chart is provided to allow the terminals direction to be observed by the look angle to a given satellite resource. Further, terrain and weather data may be utilized for determine service levels based on look angles to a given satellite.

The following are particular implementations of the planning tool for fixed and mobile satellite operations, and the resulting method(s) and resulting system(s) methods are provided as non-limiting examples.

EXAMPLES

Example 1

Fixed Antenna GEO Service Only

A user requires to plan a link in a static location with a fixed (non-steerable antenna) for a GEO only service. Using the methods and systems described herein, one may firstly review the available satellites by selecting non-LEO or non-MEO satellites. First, one chooses the service location for the service. Next, one chooses the type(s) of satellite resources that may be available. The method described herein then searches any and all satellites that may or may not be available currently or in the future for this location and displays a relevant list of satellites. The user may then select a given satellite(s) and then plan a communication link. From the satellite(s) chosen, beam maps may be analyzed and the link planning process may be performed. From the information that is made available, one would know the periods of availably, outage time, level of quality for a given link, and potential blockages by terrain. A maximized satellite communications link is then provided by execution of the method described herein.

Example 2

Movable Antenna for GEO Only Service

In particular implementations of the system described in Example 1, a user requires to plan a link in a static location with a movable (agile antenna) for a GEO only service. Using the methods and systems described herein, one may firstly review the available satellites by selecting non-LEO or non-MEO satellites. First, one chooses the service location for the service. Next, one chooses type of satellite resources that may be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. A maximized satellite communications link is then provided by execution of the method described herein.

Example 3

Movable Antenna with No Prior Access to a GEO Service

A user requires to plan a link in a static location with a movable (steerable antenna) that has traditionally not had access to a GEO service. Using the methods and systems described herein, one can firstly review the available satellites by selecting non-GEO satellites. First, one chooses the service location for the service. Next, one chooses type of satellite resources that may be available such as LEO or MEO, since GEO is known not to be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. A maximized satellite communications link is then provided by execution of the method described herein.

Example 4

Movable Antenna with No Prior Access to a GEO Service, Selecting a Non-GEO Satellite In particular implementations of the system described in Example 3, a user requires to plan a link in a dynamic location that has traditionally not had access to a GEO service. Using the methods and systems described herein, one may first review the available satellites by selecting non-GEO satellites. For traditionally denied service locations, e.g. polar regions or regions with extremely low populations. First, one chooses the service location for the service. Next, one chooses type of satellite resources that may be available such as LEO or MEO, since GEO is known not to be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. For the dynamic terminal, a given path may be established using a proposed travel path and the service may be planned against the proposed travel path based on a current or future time using the described invention. A maximized satellite communications link is then provided by execution of the method described herein.

Example 5

Fixed Antenna for GEO Only Service on Stand Alone Computer System

A user requires to plan a link in a static location with a fixed (non-steerable antenna) for a GEO only service using a standalone server for implementing the described method. This configuration does not have Internet or network access, so there is no way to utilize a network connection to obtain data. All data to be utilized is stored on the standalone computer. Using the described invention, one may firstly review the available satellites by selecting non-LEO or non-MEO satellites. First, one chooses the service location for the service. Next, one chooses type of satellite resources that may be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. A maximized satellite communications link is then provided by execution of the method described herein.

Example 6

Fixed Antenna for GEO Only Service on Cloud Based System

In particular implementations of the system described in example 5, A user requires to plan a link in a static location with a fixed (non-steerable antenna) for a GEO only service using a cloud-based connection for implementing the described method. This configuration has Internet or network access, so the data is provided by a network connection to obtain data. The methods described herein utilize data solely obtained within the cloud-computing architecture. Using the described invention, one may firstly review the available satellites by selecting non-LEO or non-MEO satellites. First, one chooses the service location for the service. Next, one chooses type of satellite resources that may be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. A maximized satellite communications link is then provided by execution of the method described herein.

Example 7

Movable Antenna with No GEO Service on Standalone Computer System

A user requires to plan a link in a static location with a movable (steerable antenna) that has traditionally not had access to a GEO service using a standalone server for implementing. Using the method described herein, one may firstly review the available satellites by selecting non-GEO satellites. For traditionally denied service locations, e.g. polar regions or regions with extremely low populations. This configuration does not have Internet or network access, so there is no way to utilize a network connection to obtain data. All data to be utilized is stored on the standalone computer. First, one chooses the service location for the service. Next, one chooses type of satellite resources that may be available such as LEO or MEO, since GEO is known not to be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. A maximized satellite communications link is then provided by execution of the method described herein.

Example 8

Movable Antenna with No GEO Service on Cloud Based System

In particular implementations of the system described in example 7, a user requires to plan a link in a dynamic location that has traditionally not had access to a GEO service using a cloud-based connection for implementing the described method. Using the methods described herein, one may first review the available satellites by selecting non-GEO satellites. This configuration has Internet or network access, so the data is provided by a network connection to obtain data. Both the described invention and all that data to be utilized is obtained within the cloud-computing architecture. First, one chooses the service location for the service. Next, one chooses type of satellite resources that may be available such as LEO or MEO, since GEO is known not to be available. The planning tool then searches any and all satellites that may or may not be available currently or in the future for this location and displays a list of relevant satellites. The user may then select a given satellite(s) and then plan a communication link. From the satellite(s) chosen, beam maps may be reviewed and the link planning process may be performed. From the information that is made available, one would know the periods of availably, outage time, level of quality for a given link, and potential blockages by terrain. For the dynamic terminal, a given path may be established using a proposed travel path and the service may be planned against the proposed travel path based on a current or future time using the described invention. A maximized satellite communications link is then provided by execution of the method described herein.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in electrical engineering, telecommunications, computer science, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

We claim:
1. A method for planning a satellite communication link comprising executing a satellite communication link planning program comprising:
    (a) inputting the user location, optionally via a terminal,
    (b) determining the look angle based on the user location,

(c) searching databases comprising information about a satellite or a plurality of satellites in view based on the user's location,
(d) accessing the information about a satellite or a plurality of satellites in view based on the user's location,
(e) accessing the available frequency bands for a given satellite,
(f) accessing the information about a beam or a plurality of beams for each or a plurality of satellites,
(g) accessing the satellite dwell time overhead;
(h) accessing the polarization, optionally circular or linear;
(i) calculating the azimuth, elevation, and polarity of the terminal,
(j) calculating the optimal antenna size based on current or future locations of the satellite,
(k) analyzing the information to determining a satellite communication link based on the information,
(l) providing the satellite communication link information,
and (m) optionally, storing the session data for future retrieval and analysis.

2. The method of claim 1, wherein the method further comprises machine learning to classify the data to produce a satellite communications link information.

3. The method of claim 1, wherein the machine learning utilizes both past and current empirical information in the form of the success or lack of success based on prior planning information.

4. The method of claim 1, wherein the machine learning system is trained using historic data, current data, optionally accessed from static and/or dynamic databases, or a combination thereof and is configured to access and/or process data from static databases, dynamic databases, and combinations thereof.

5. The method of claim 1, wherein the machine learning system is configured to access and/or process data comprising weather data, terrain data, video data, geographic data, traffic data, satellite cost data, crowd-sourced data, signal strength, satellite positions, cost of satellite service, transmission times, obstructions to communications, wavelengths, location, optionally comprising latitude and longitude, altitude, terminal configuration, available satellites, available beam on a given satellite, topography, weather, minimum or maximum antenna size, minimum or maximum amplifier size, minimum carrier power level requirements, maximum carrier power level requirements, minimum look-angle requirements, maximum look-angle requirements, look angles with block-out/non-transmit zones and angles, and combinations thereof.

6. The method of claim 1, wherein the machine learning system utilizes an algorithm selected from the group consisting of decision tree (DT), linear regression (LIR), logistic regression (LOR), support vector machine (SVM), Naïve Bayes (NB), k-nearest neighbors (KNN), K-means (KM), Random Forest (RF), Dimensionality Reduction Algorithms (DRA), Gradient Boosting (GB) algorithms, or a combination of more than one algorithm, the GB algorithm may be gradient boosting machine (GBM), extreme gradient boost (XGBoost), LightGBM, CatBoost, or an ensemble of algorithms.

7. The method of claim 1, wherein the machine learning system comprises Reinforcement Learning System (RLS), and uses an algorithm selected from the group consisting of a Monte Carlo algorithm (MC), Q-learning (QL) algorithm, State-action-reward-state-action (SARSA) algorithm, Q-learning-lambda algorithm, SARSA-lambda algorithm, DQN (Deep Q Network) algorithm, DDPG (Deep Deterministic Policy Gradient) algorithm, A3C (Asynchronous Advantage Actor-Critic Algorithm) algorithm, NAF (Q-learning with normalized Advantage functions) algorithm, TRPO (Trust Region Policy Optimization) algorithm, PPO (Proximal Policy Optimization) algorithm, TD3 (twin delayed deep deterministic policy gradient) algorithm, SAC (Soft Actor-Critic) algorithm, or an ensemble of algorithms.

8. The method of claim 1, further comprising accessing a computer system configured to execute the satellite communication link planning program via a terminal.

9. The method of claim 1, wherein the information accessed by the method further comprises gains and losses of power, gain, attenuation, atmospherics, scintillation effects, ionospheric effects, Faraday rotation, Adjacent Channel Interference (ACI), Adjacent Satellite Interference, and combinations thereof.

10. The method of a claim 1, wherein the method further comprises sending instructions for controlling a satellite antenna or a plurality of satellite antennas to support satellite communication link(s).

11. The method of claim 1, wherein the method further comprises pre-planning an optimal path to ensure beam coverage based on geolocation, blockages, optionally based on geography, weather events, and combinations thereof.

12. The method of claim 1, wherein the method further comprises scheduling the execution of the user data during regulatory permissive periods, optionally when the terminal is at maximum performance to transmit data.

13. The method of claim 1, wherein the method further comprises providing an estimated signal power analysis for the purpose of satellite tracking for mission planning purposes.

14. The method of claim 1, wherein the user sets criteria to limit the selection of a given satellite configuration based on a minimum or maximum antenna size, minimum or maximum amplifier size, minimum carrier power level requirements, maximum carrier power level requirements, minimum look-angle requirements, maximum look-angle requirements, look angles with block-out/non-transmit zones and angles, or a combination thereof.

15. The method of claim 1, wherein the terminal is a fixed terminal, Communications on the Move (COTM) system, Communication on the Pause (COTP), or a combination thereof.

16. The method of claim 1, wherein the satellite is a LEO satellite, GEO satellite, MEO satellite, or a combination thereof.

17. The method of claim 1, wherein the method is executed on a disparate and distributed configuration where the method and system operate in a cloud-based configuration.

18. The method of claim 1, wherein the planning information, for satellite, beams, and any information required for feeding the tool is stored on the standalone server, stored separately from the standalone server, stored in a cloud network, or a combination thereof.

19. The method of claim 1, wherein the satellite communications link information is stored on a standalone server, stored separately from a standalone server, stored in a cloud network, or a combination thereof.

20. A system configured to execute the method of claim 1.

* * * * *